Nov. 16, 1937.  A. S. BLOOMQUIST  2,099,594
POWER LIFT LEVER
Filed Sept. 14, 1936
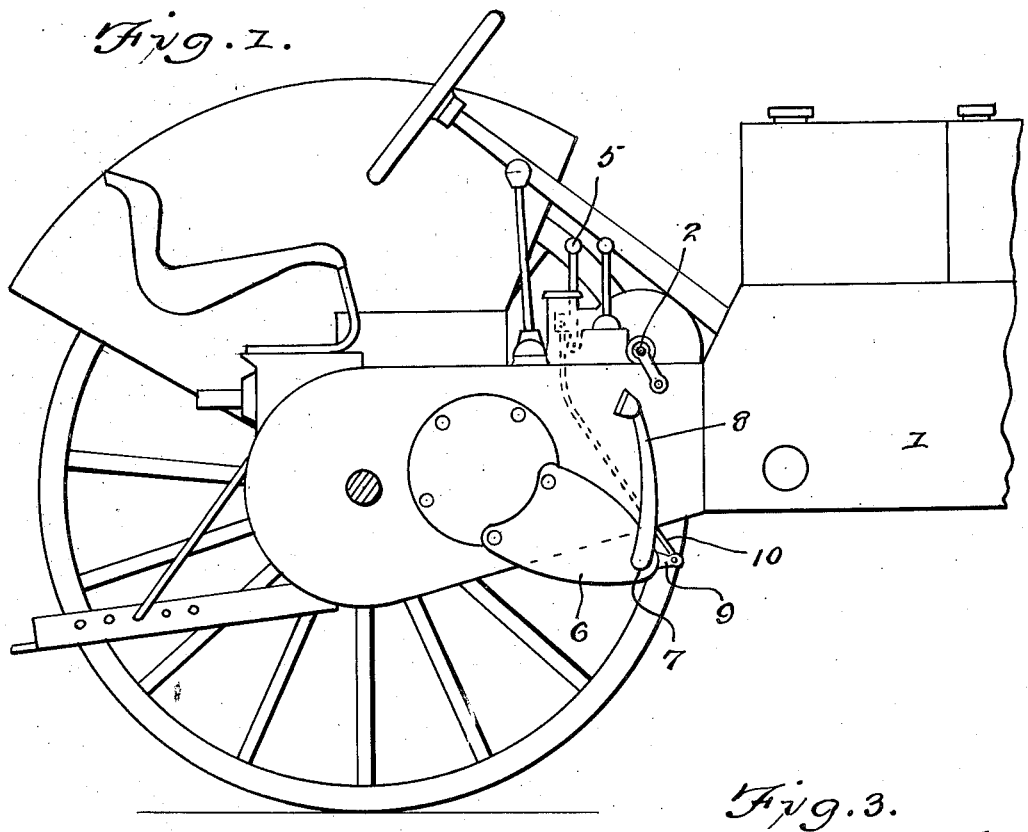
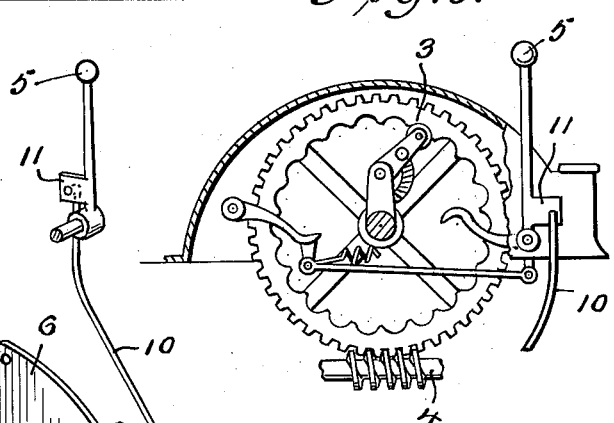
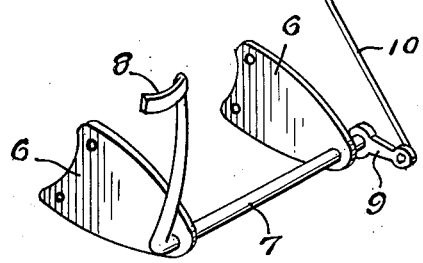
Algot S. Bloomquist
INVENTOR
BY Victor J. Evans & Co.
ATTORNEY Patented Nov. 16, 1937

2,099,594

UNITED STATES PATENT OFFICE 2,099,594

POWER LIFT LEVER

Algot S. Bloomquist, Paxton, Ill.

Application September 14, 1936, Serial No. 100,712

1 Claim. (Cl. 97—50)

This invention relates to an attachment for a tractor of the type having a hand control for the implement lift clutch of said tractor and has for the primary object the provision of a simple and inexpensive device which will permit the operator of the tractor to easily and quickly control by the foot as well as by the hand the implement lift clutch of the tractor.

With these and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a fragmentary side elevation, partly in section, showing my invention adapted to a tractor.

Figure 2 is a perspective view illustrating the attachment.

Figure 3 is a fragmentary sectional view illustrating the clutch and its hand control lever with the connecting portion of my invention connected thereto.

Referring in detail to the drawing, the numeral 1 indicates a tractor equipped with an implement lift 2 including an implement lift clutch 3 geared to a power take-off shaft 4 of the tractor. The clutch 3 is controlled on a tractor of this type by a hand lever 5 and in order that the clutch 3 may be controlled also by the foot of the operator my attachment is provided and consists of a pair of attaching plates 6 bolted or otherwise secured to the tractor, as shown in Figure 1. The plates 6 provide journals for a shaft 7, one end of which is formed to provide a clutch pedal 8 and the other end is connected to an arm 9. Pivoted to the arm 9 is a link 10 and the latter in turn is pivoted to an ear 11 formed on the hand lever 5 so that on depressing the foot pedal 8 by the foot of the operator movement will be imparted to the hand lever 5 to conveniently bring about actuation of the clutch 3. As the clutch forms no part of the present invention it is not believed necessary to describe the same in detail nor any of the other parts of the tractor.

Having described the invention, I claim:

In combination with a tractor having an implement lift and a clutch therefor provided with a hand controlled lever, an ear formed on said lever, spaced plates secured on the tractor, a shaft journaled on said plates, a foot pedal formed on one end of the shaft, an arm secured on the other end of the shaft, and a link connecting said arm to said ear whereby movement of the hand lever may be caused through the actuation of the pedal by an operator's foot.

ALGOT S. BLOOMQUIST.